United States Patent
Matsuhira (10) Patent No.: US 7,570,822 B2
(45) Date of Patent: Aug. 4, 2009

(54) IMAGE PROCESSING APPARATUS, PRINTER AND CONTROL METHOD OF THE IMAGE PROCESSING

(75) Inventor: Masatoshi Matsuhira, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 733 days.

(21) Appl. No.: 11/234,116

(22) Filed: Sep. 26, 2005

(65) Prior Publication Data
US 2006/0088223 A1    Apr. 27, 2006

(30) Foreign Application Priority Data
Sep. 28, 2004    (JP)    ............................ 2004-282533

(51) Int. Cl.
*G06K 9/36* (2006.01)
*G06K 9/46* (2006.01)

(52) U.S. Cl. .................. 382/233; 382/250; 382/296

(58) Field of Classification Search ................. 382/233, 382/235, 250, 289, 296; 358/1.15
See application file for complete search history.

(56) References Cited

U.S. PATENT DOCUMENTS 6,175,653 B1 * 1/2001 de Queiroz ................ 382/233
6,208,429 B1 * 3/2001 Anderson .................. 358/1.18

FOREIGN PATENT DOCUMENTS

JP    2001-086318 A    3/2001

* cited by examiner

*Primary Examiner*—Phuoc Tran
(74) *Attorney, Agent, or Firm*—Sughrue Mion, PLLC (57) ABSTRACT

When data of one block is subjected to Huffman decoding (S100 to S120), inverse quantization processing is executed on the decoded data (S130), and when a present block is a starting point block, starting point restoring information (file pointer, decoding intermediate information and DC component) for restoring the image file with the block as a starting point is stored in a predetermined area of a data buffer (S140, S150). Then, inverse DCT calculation processing is carried out, color conversion processing is executed (S160, S170) and the histogram of RGB values is accumulated and stored in a predetermined area of the data buffer (S180).

14 Claims, 10 Drawing Sheets

STARTING POINT BLOCK

STARTING POINT BLOCK

IMAGE PROCESSING APPARATUS, PRINTER AND CONTROL METHOD OF THE IMAGE PROCESSING

BACKGROUND OF THE INVENTION

1. Field of the Invention

The present invention relates to an image processing apparatus, a printer, a control method of the image processing, and a storage medium in which an image processing program is stored, and more specifically to an image processing apparatus for restoring compressed data of an image and subjecting the image data thus restored to predetermined image processing, a printer equipped with the image processing apparatus, an image processing method of restoring compressed data of an image and subjected to the image data thus restored to predetermined image processing, and a storage medium stored with an image processing program for restoring compressed data of an image and subjecting the image data thus restored to predetermined processing.

2. Description of the Prior Art

Conventionally, as such a type of image processing apparatus, an image processing apparatus has been proposed in which when an image compressed in the JPEG format etc., is rotated and outputted, the image concerned is sequentially restored from an image to be located at the upper end after the rotation and outputted (for example, see Japanese Published Unexamined Patent Application No. 2001-86318). In this apparatus, a block located at the left end of an original image is set as a starting point block, and information for restoring compressed data (file pointer, CD component, etc., of the starting point block) is obtained from the starting point block and stored. The compressed data is restored at some midpoint by using the information thus stored, and the original image is sequentially outputted from an image to be located at the upper end after the rotation. Accordingly, as compared with the processing of restoring the overall image and then rotating the image, the compressed image can be efficiently rotated and outputted with a small memory capacity.

SUMMARY OF THE INVENTION

In the above-described image processing apparatus, in order to obtain the information for restoring the compressed data from the starting point block, it is necessary to temporarily restore the compressed data from the beginning sequentially, and the restoration of the compressed data as described above tends to require much processing time. On the other hand, considering a case where the above-described image processing apparatus is applied to a printer, etc., the increase in the processing time required for restoration of the compressed data, etc., results in an increase in standby time until printing is started. Therefore, it is preferable to shorten the processing time and enhance the efficiency thereof as much as possible.

The image processing apparatus, the printer, the image processing method and the storage medium stored with the image processing program of the present invention have an object to shorten the processing time for the rotation and output of a compressed image. Furthermore, the image processing apparatus, the printer, the image processing method and the storage medium stored with the image processing program of the present invention have another object to carry out the rotation and output of a compressed image.

In order to attain at least one of the above-described objects, the image processing apparatus, the printer equipped with the image processing apparatus, the image processing method and the image processing program have the configurations discussed below.

The present invention is directed to an image processing apparatus for restoring compressed data of an image and subjecting the image to predetermined image processing, and the image processing apparatus includes: a data storage module for storing data; an information calculating and obtaining module for sequentially restoring compressed data of an indicated image from the head thereof to the extent that at least pixel information can be obtained, calculating characteristic information indicating the characteristic of the image on the basis of the pixel information, storing the characteristic information in the data storage module, obtaining starting point restoring information for restoring the compressed data with a predetermined position of the image as a starting point in a process of restoring the compressed data and storing the starting point restoring information into the data storage module; an image generator for restoring the compressed data of the image on the basis of the starting point restoring information stored in the data storage module with the predetermined position as a starting point when an output instruction containing rotation of the indicated image is made, thereby sequentially generating the image after the rotation from the upper end thereof, and also carrying out predetermined image processing on the image after the rotation generated on the basis of the characteristic information stored in the data storage module; and an image output module for outputting the image subjected to the predetermined image processing.

In the image processing apparatus of the present invention, characteristic information of an indicated image is calculated and stored on the basis of pixel information obtained by sequentially restoring the compressed data of the indicated image from the head thereof, starting point restoring information for restoring the compressed data of the image from a predetermined position of the image is obtained and stored in the restoration process, the compressed data is restored with the predetermined position as a starting point by using the starting point restoring information thus stored to sequentially generate an image after the rotation from the upper end, and the image thus generated is subjected to predetermined image processing on the basis of the stored characteristic information and outputted. Accordingly, in order to calculate the characteristic information of the image, the starting point restoring information can be obtained and stored in the process of restoring the compressed data. That is, the processing time can be further shortened and the processing efficiency can be further enhanced as compared with a case where the restoration of the compressed data to calculate the image characteristic information and the restoration of the compressed data to obtain the starting point restoring information are separately carried out from each other. Here, various kinds of information may be used as "characteristic information," and for example, statistical information such as a histogram of pixel values, an average value, etc., may be used. Various kinds of image processings based on the characteristic information may be used as the "predetermined image processing." For example, the processing for enlarging the contrast of an image, the processing of correcting brightness, color saturation, etc., may be used. As the "starting point restoring information" address information may be used in the compressed data of the image corresponding to the predetermined position, etc.

In the image processing apparatus of the present invention thus constructed, the predetermined position may contain a position that will become the upper end when the image is rotated in a predetermined direction by a predetermined angle. Here, "predetermined direction and predetermined angle" may be set "in the clockwise direction by 90°." In this case, the predetermined position corresponds to the left end of the original image. Accordingly, by restoring the compressed data with the left end of the image as a starting point, the processing time and the processing efficiency when the image to be obtained through the clockwise rotation by 90° is sequentially generated from the upper end can be shortened and enhanced.

In the image processing apparatus of the present invention, an information calculating and obtaining module may calculate the characteristic information on the basis of the pixel information of predetermined sampling target pixels, and store the characteristic information thus calculated into a data storage module. With this operation, the processing load can be further reduced as compared with a case where the characteristic information is calculated on the basis of the pixel information of all the pixels.

In the image processing apparatus of the present invention, the compressed data of the image is compressed data based on the JPEG format obtained by dividing the image into blocks each having a plurality of pixels and then compressing the image, and the starting point restoring information may contain not only address information in the compressed data of the image corresponding to the block at the predetermined position, but also the DC component of a DCT coefficient of the block. Here, the DC component of the DCT coefficient is contained as the starting point restoring information with respect to compressed data based on the JPEG format, difference value between previous and next blocks being compressed in the DC component. In the image processing device of the embodiment of the present invention, the information calculating and obtaining module restores the compressed data of the image by an entropy decoding step of subjecting the compressed data of the indicated image to entropy decoding to obtain a quantized DCT coefficient, an inversely quantizing step of subjecting the obtained quantized DCT coefficient to inverse quantization to obtain a DCT coefficient, and an inverse DCT step of subjecting the obtained DCT coefficient to inverse DCT to obtain pixel information, and obtains the quantized DC component of the quantized DCT coefficient obtained in the entropy decoding step or the DC component of the DCT coefficient obtained in the inversely quantizing step as the DC component of the starting point restoring information.

The present invention is directed to a printer including: a data obtaining module for obtaining compressed data of an image from a communicable storage medium; a data storage module for storing data; an information calculating and obtaining module for sequentially restoring compressed data of an indicated image from the head thereof to the extent that at least pixel information can be obtained, calculating characteristic information indicating the characteristic of the image on the basis of the pixel information, storing the characteristic information in the data storage module, obtaining starting point restoring information for restoring the compressed data with a predetermined position of the image as a starting point in a process of restoring the compressed data and storing the starting point restoring information into the data storage module; an image generator for restoring the compressed data on the basis of the starting point restoring information stored in the data storage module with the predetermined position as a starting point when an output instruction containing rotation of the indicated image is made, thereby sequentially generating the image after the rotation from the upper end thereof, and also carrying out predetermined image processing on the image after the rotation generated on the basis of the characteristic information stored in the data storage module; an image output module for outputting the image subjected to the predetermined image processing; and a print executing module for printing the outputted image.

In the printer of the present invention, characteristic information of an indicated image is calculated and stored on the basis of pixel information obtained by sequentially restoring the compressed data of the indicated image from the head thereof, starting point restoring information for restoring the compressed data of the image from a predetermined position of the image is obtained and stored in the restoration process, the compressed data is restored with the predetermined position as a starting point by using the starting point restoring information thus stored to sequentially generate an image after the rotation from the upper end, and the image thus generated is subjected to predetermined image processing on the basis of the stored characteristic information and outputted. Accordingly, in order to calculate the characteristic information of the image, the starting point restoring information can be obtained and stored in the process of restoring the compressed data. That is, the processing time can be further shortened and the processing efficiency can be further enhanced as compared with a case where the restoration of the compressed data to calculate the image characteristic information and the restoration of the compressed data to obtain the starting point restoring information are separately carried out from each other. Here, various kinds of information may be used as "characteristic information," and for example, statistical information such as a histogram of pixel values, an average value, etc., may be used. Various kinds of image processings based on the characteristic information may be used as the "predetermined image processing." For example, the processing for enlarging the contrast of an image, the processing of correcting brightness, color saturation, etc., may be used. As the "starting point restoring information" address information may be used in the compressed data of the image corresponding to the predetermined position, etc.

In the printer of the present invention thus constructed, the predetermined position may contain a position that will become the upper end when the image is rotated in a predetermined direction by a predetermined angle. Here, "predetermined direction and predetermined angle" may be set "in the clockwise direction by 90°." In this case, the predetermined position corresponds to the left end of the original image. Accordingly, by restoring the compressed data with the left end of the image as a starting point, the processing time and the processing efficiency when the image to be obtained through the clockwise rotation by 90° is sequentially generated from the upper end can be shortened and enhanced.

In the printer of the present invention, the information calculating and obtaining module may calculate the characteristic information on the basis of the pixel information of predetermined sampling target pixels, and store the characteristic information thus calculated into a data storage module. With this operation, the processing load can be further reduced as compared with a case where the characteristic information is calculated on the basis of the pixel information of all the pixels.

In the printer of the present invention, the compressed data of the image is compressed data based on the JPEG format obtained by dividing the image into blocks each having a plurality of pixels and then compressing the image, and the starting point restoring information may contain not only address information in the compressed data of the image corresponding to the block at the predetermined position, but also the DC component of a DCT coefficient of the block.

Here, the DC component of the DCT coefficient is contained as the starting point restoring information with respect to compressed data based on the JPEG format, difference value between previous and next blocks being compressed in the DC component. In the printer of the embodiment of the present invention, the information calculating and obtaining module restores the compressed data of the image by an entropy decoding step of subjecting the compressed data of the indicated image to entropy decoding to obtain a quantized DCT coefficient, an inversely quantizing step of subjecting the obtained quantized DCT coefficient to inverse quantization to obtain a DCT coefficient, and an inverse DCT step of subjecting the obtained DCT coefficient to inverse DCT to obtain pixel information, and obtains the quantized DC component of the quantized DCT coefficient obtained in the entropy decoding step or the DC component of the DCT coefficient obtained in the inversely quantizing step as the DC component of the starting point restoring information.

The present invention is directed to an image processing method for restoring compressed data of an image and subjecting the image to predetermined image processing, and the method including the steps of: (a) sequentially restoring compressed data of an indicated image from the head thereof to the extent that at least pixel information can be obtained, calculating characteristic information indicating the characteristic of the image on the basis of the pixel information, storing the characteristic information, obtaining starting point restoring information for restoring the compressed data with a predetermined position of the image as a starting point in a process of restoring the compressed data and storing the starting point restoring information; (b) restoring the compressed data of the image on the basis of the starting point restoring information stored in the step (a) with the predetermined position as a starting point when an output instruction containing rotation of the indicated image is made, thereby sequentially generating the image after the rotation from the upper end thereof, and also carrying out predetermined image processing on the image after the rotation generated on the basis of the characteristic information stored in the step (a); and (c) outputting the image subjected to the predetermined image processing.

In the image processing method of the present invention, characteristic information of an indicated image is calculated and stored on the basis of pixel information obtained by sequentially restoring the compressed data of the indicated image from the head thereof, starting point restoring information for restoring the compressed data of the image from a predetermined position of the image is obtained and stored in the restoration process, the compressed data is restored with the predetermined position as a starting point by using the starting point restoring information thus stored to sequentially generate an image after the rotation from the upper end, and the image thus generated is subjected to predetermined image processing on the basis of the stored characteristic information and outputted. Accordingly, in order to calculate the characteristic information of the image, the starting point restoring information can be obtained and stored in the process of restoring the compressed data. That is, the processing time can be further shortened and the processing efficiency can be further enhanced as compared with a case where the restoration of the compressed data to calculate the image characteristic information and the restoration of the compressed data to obtain the starting point restoring information are separately carried out from each other. Here, various kinds of information may be used as "characteristic information," and for example, statistical information such as a histogram of pixel values, an average value, etc., may be used. Various kinds of image processings based on the characteristic information may be used as the "predetermined image processing." For example, the processing for enlarging the contrast of an image, the processing of correcting brightness, color saturation, etc., may be used. As the "starting point restoring information" address information may be used in the compressed data of the image corresponding to the predetermined position, etc.

The present invention is directed to a storage medium stored with an image processing program of restoring compressed data of an image and subjecting the compressed data of the image to predetermined image processing, where the image processing program is equipped with an information calculating and obtaining module for sequentially restoring the compressed data of the indicated image from the head thereof to the extent that at least pixel information can be obtained, calculating characteristic information indicating the characteristic of the image on the basis of the pixel information, storing the characteristic information, obtaining starting point restoring information for restoring the compressed data with a predetermined position of the image as a starting point in a process of restoring the compressed data and storing the starting point restoring information; an image generating module for restoring the compressed data of the image with the predetermined position as a starting point on the basis of the starting point restoring information stored in the information calculating and obtaining module when an output instruction containing rotation of the indicated image is made, thereby sequentially generating the image after the rotation from the upper end thereof, and subjecting the generated image after the rotation to predetermined image processing on the basis of the characteristic information stored in the information calculating and obtaining module; and an image output module for outputting the image subjected to the predetermined image processing.

With respect to the storage medium stored with the image processing program of the present invention, by installing the image processing program and starting it, the compressed data of the indicated image is sequentially restored from the head thereof, and the characteristic information of the image is calculated and stored on the basis of the obtained pixel information. In addition, the starting point restoring information for restoring the compressed data from a predetermined position of the image is obtained and stored in the restoring process, the compressed data is restored with the predetermined position as a starting point by using the stored starting point restoring information to sequentially generate the image after the rotation from the upper end, and the image thus generated is subjected to the predetermined image processing on the basis of the stored characteristic information and then outputted. Accordingly, in order to calculate the characteristic information of the image, the starting point restoring information can be obtained and stored in the process of restoring the compressed data. That is, the processing time can be further shortened and the processing efficiency can be further enhanced as compared with a case where the restoration of the compressed data to calculate the image characteristic information and the restoration of the compressed data to obtain the starting point restoring information are separately carried out from each other. Here, various kinds of information may be used as "characteristic information," and for example, statistical information such as a histogram of pixel values, an average value, etc., may be used. Various kinds of image processings based on the characteristic information maybe used as the "predetermined image processing." For example, the processing for enlarging the contrast of an image, the processing of correcting brightness, color saturation, etc., may be used. As the "starting point restoring information" address information may be used in the compressed data of the image corresponding to the predetermined position, etc.

DESCRIPTION OF THE PREFERRED EMBODIMENTS

Figure 1:
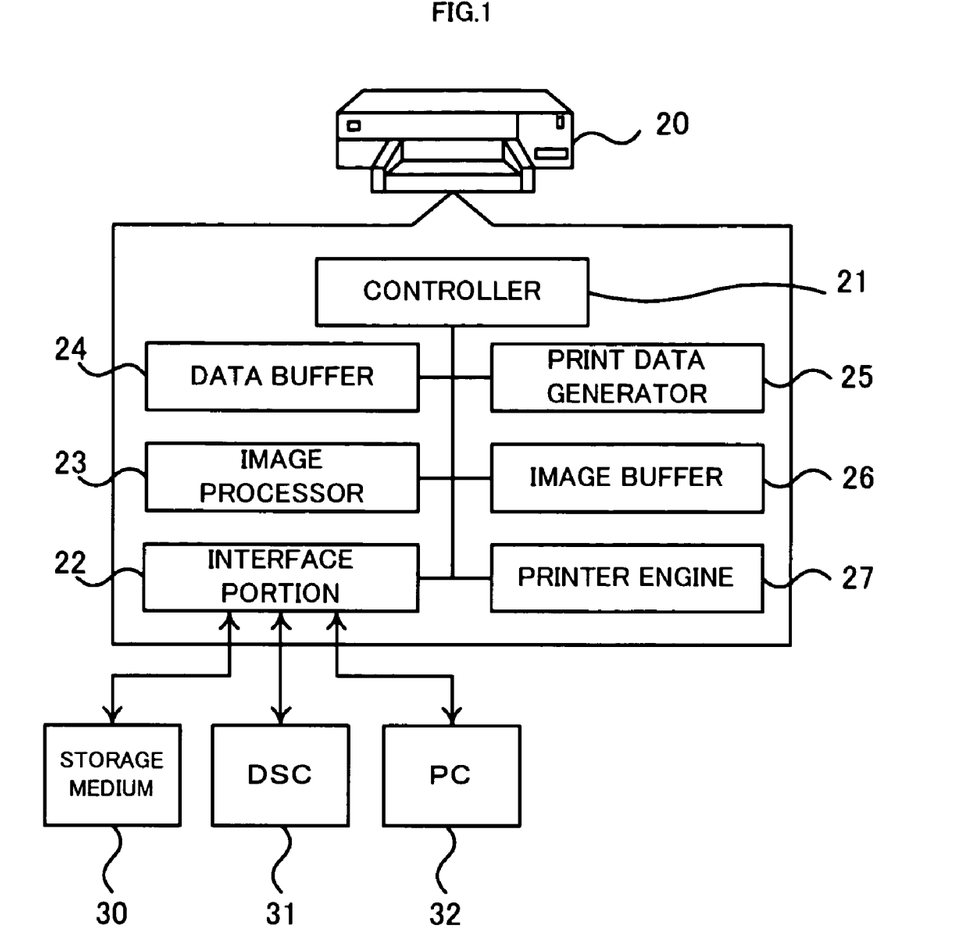
FIG. 1 is a diagram showing the construction of a printer 20 in which an image processing apparatus of the present invention is mounted.

Next, preferable embodiments for implementing the present invention will be described. FIG. 1 is a diagram showing the construction of a printer 20 in which an image processing apparatus of an embodiment of the present invention is mounted. As shown in FIG. 1, the printer 20 of the embodiment is equipped with a controller 21 for controlling the overall apparatus, an interface portion 22 for carrying out the connection to a storage medium 30 like a memory card, etc., a digital still camera 31, a personal computer 32, etc., an image processor 23 for subjecting an image file read out from the storage medium 30, etc., to various kinds of image processings, a data buffer 24 for temporarily storing data, a print data generator 25 for subjecting the read-in image file to color conversion processing, binaization processing, etc., to generate print data, an image buffer 26 for accumulating the print data thus generated, and a printer engine 27 for executing printing on the basis of print data accumulated in the image buffer 26, and the printer 20 is constructed as an ink jet printer for jetting each color ink to a sheet to carry out the printing. The image processor 23 also carries out the processing of restoring an image file which is compressed in the JPEG format, etc., and stored in the storage medium 30, etc. The image file of the JPEG format is compressed through the steps of block division, discrete cosine transformation (hereinafter referred to as DCT) operation, quantization processing, Huffman coding, etc. The image file of the above-described JPEG format is a general image file, and detailed description thereof is omitted because it does not constitute the main part of the present invention.

Figure 2:
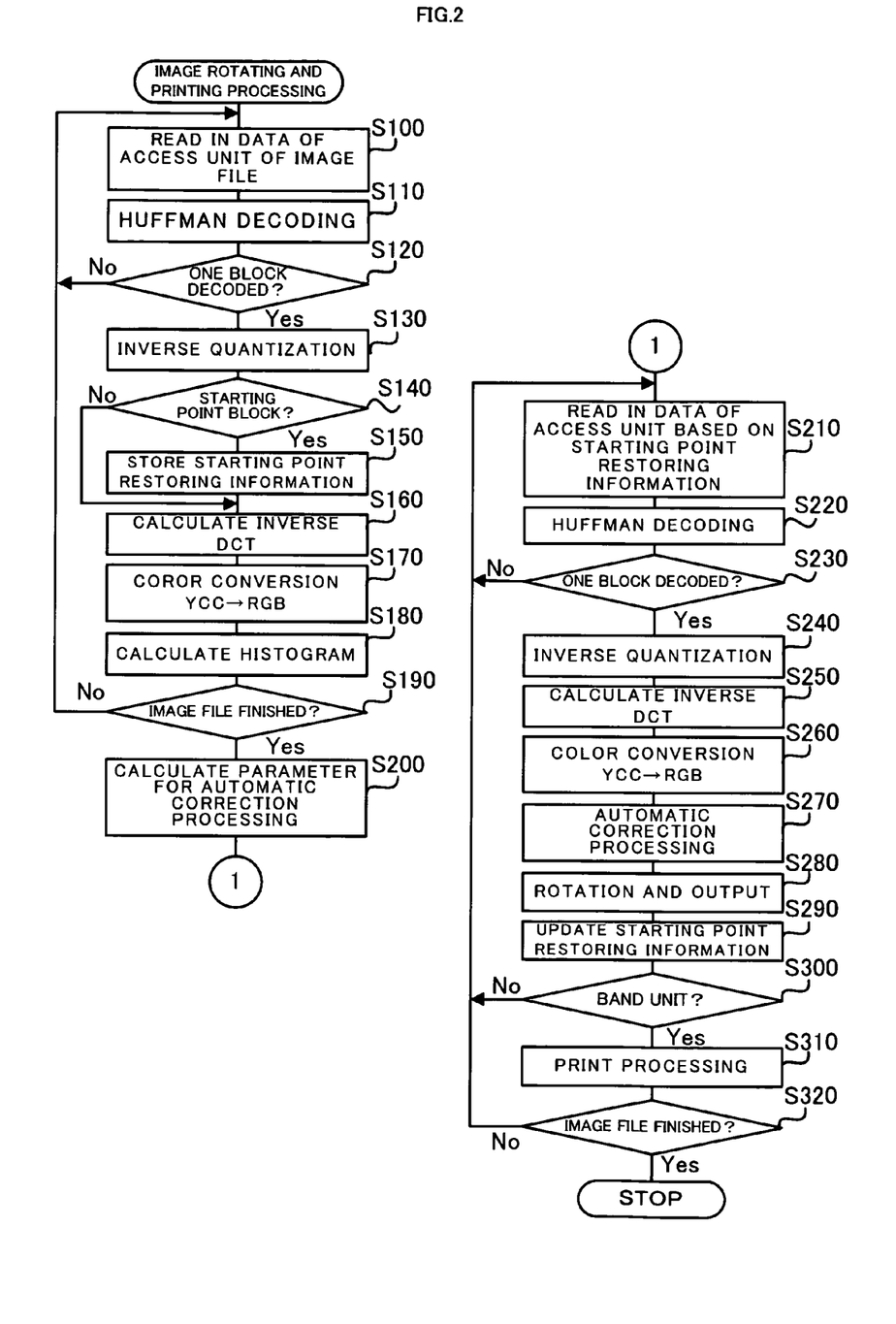
FIG. 2 is a flowchart showing an example of image rotating and printing processing.

Next, the operation of the printer 20 thus constructed, particularly the operation of rotating and printing the image file read out from the storage medium 30, etc., will be described. FIG. 2 is a flowchart showing an example of image rotating and printing processing executed by the controller 21, the image processor 23, the print data generator 25, etc., when a print instruction containing rotation of an image file is carried out. As a case where a print instruction containing rotation of an image file is made, for example, a case may be considered where a print layout requiring rotation of an image file is set via an operating panel (not shown) of the printer 20, etc., and a print instruction is made. Furthermore, in the embodiment, a case where the image file is rotated clockwise by 90° will be described as a specific example.

Figure 3:
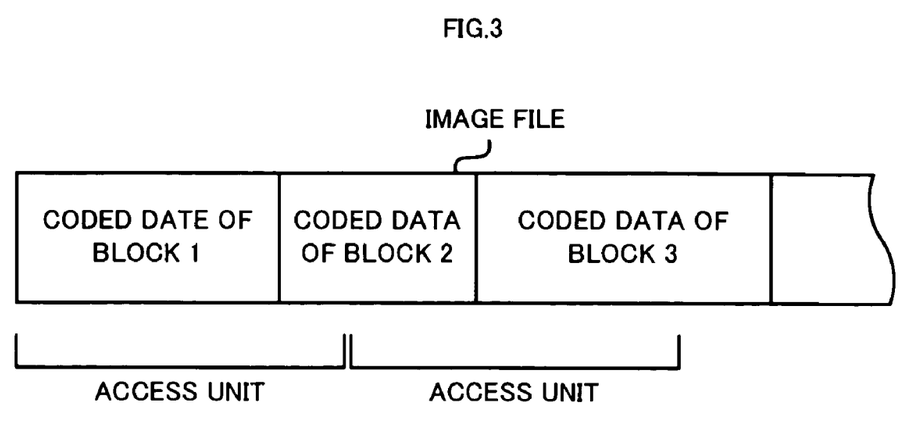
FIG. 3 is a diagram showing the relationship between a block and an access unit of an image file.

In the image rotating and printing processing, data of one access unit of an image file associated with the print instruction is read out from the storage medium 30, etc., as shown in the figures (step S100), and the processing of subjecting the read-out data to Huffman decoding is executed (step S110). Here, the access unit is a read-in unit of data predetermined in accordance with the specification of the storage medium 30, etc., and for example, it corresponds to the sector in the flash memory, etc. Furthermore, as shown in FIG. 3, the data size of each block of the image file compressed in the JPEG format is not necessarily coincident with the access unit, and the data size is different among the respective blocks. Therefore, the data of one block may extend over a plurality of access units.

Data of each access unit is read in until the data of one block is Huffman-decoded, and Huffman decoding processing is repetitively executed. When the data of one block is decoded (step S120), inverse quantization processing is executed on the decoded data (quantized DCT coefficient of block) (step S130). By executing the inverse quantization processing, the DCT coefficient of the block is obtained. Here, in the image file of the JPEG format, with respect to the quantized DC component of the quantized DCT coefficient, the differential value between blocks is subjected to Huffman coding. Therefore, the quantized DC component is obtained by accumulating the differential value of the quantized DC component obtained by Huffman decoding, and the inverse quantization processing is carried out on the quantized DC component to obtain the DC component.

Figure 4:
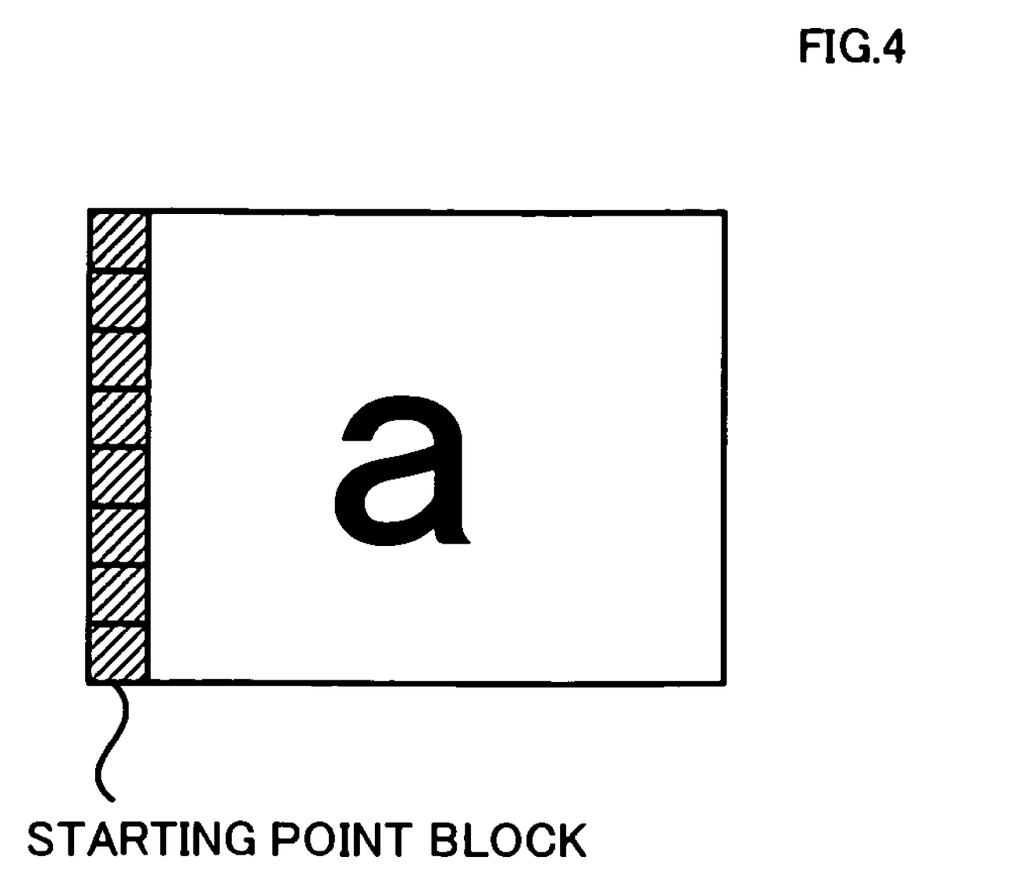
FIG. 4 is a diagram showing an example of a starting point block.

Subsequently, it is judged whether the present block is a starting point block or not (step S140). Here, the starting point block is a block serving as a starting point to restore an image file from some midway point thereof. In the embodiment, a left-end block located at the upper end when the image is rotated clockwise by 90° is set as a starting point block (see FIG. 4).

Figure 5:
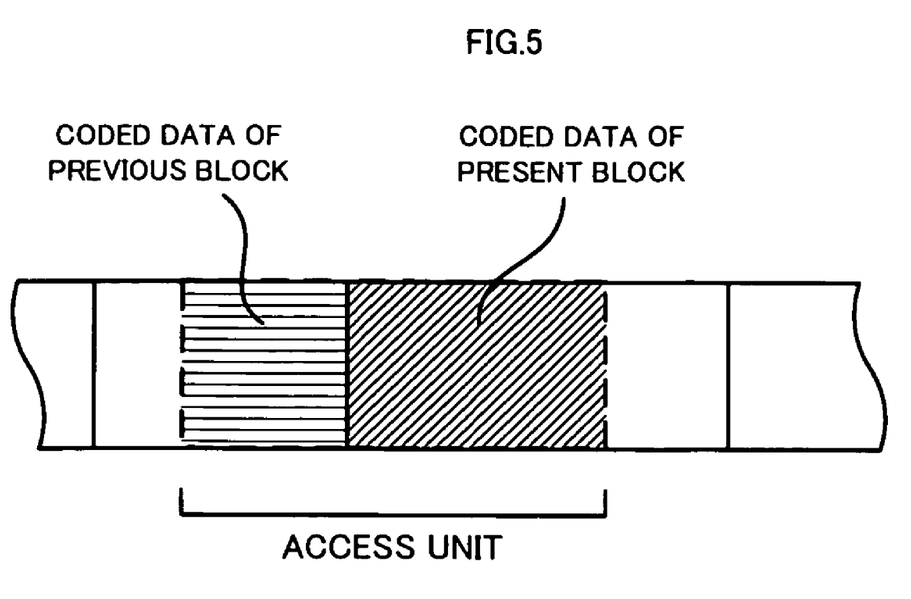
FIG. 5 is a diagram showing the concept of decoding intermediate information.

When the present block is a starting point block, the starting point restoring information for restoring the image file with the block set as a starting point is stored in a predetermined area of the data buffer 24 (step S150). The starting point restoring information is specifically constructed by a file pointer for indicating the access-unit based physical position from which the data of the starting point block is started, decoding intermediate information for Huffman-decoding the data of the starting point block from the access unit and the DC component of the starting point block. FIG. 5 is a diagram showing the concept of the decoding intermediate information. As described above, the data size of each block and the access unit are not necessarily coincident with each other, and the data size is different among the blocks. Therefore, the access unit in which the data of the starting point block is started contains the data of the preceding block. Accordingly, in order to Huffman-decode the data of the starting point block, information concerning Huffman decoding of the data of the preceding block (for example, Huffman-decoded bit number as data of the preceding data, etc.,) is required, and the information as described above corresponds to the decoding intermediate information.

Subsequently, the inverse DCT calculation processing is carried out on the DCT coefficient obtained by the inverse quantization processing of the step S130 to obtain the pixel information of the block (step S160), and the color conversion processing for converting the color space of the pixel information thus obtained is executed (step S170). Here, the color conversion processing is the processing of converting the YCC color space used in the image file of the JPEG format to the RGB color space.

When the pixel information converted to the RGB color space is obtained, a histogram representing a distribution of RGB values of the overall image file is accumulated and stored in the predetermined area of the data buffer 24 (step S180). Target pixels for which the histogram is accumulated may be set to pixels sampled in an appropriate rule.

Figure 6:
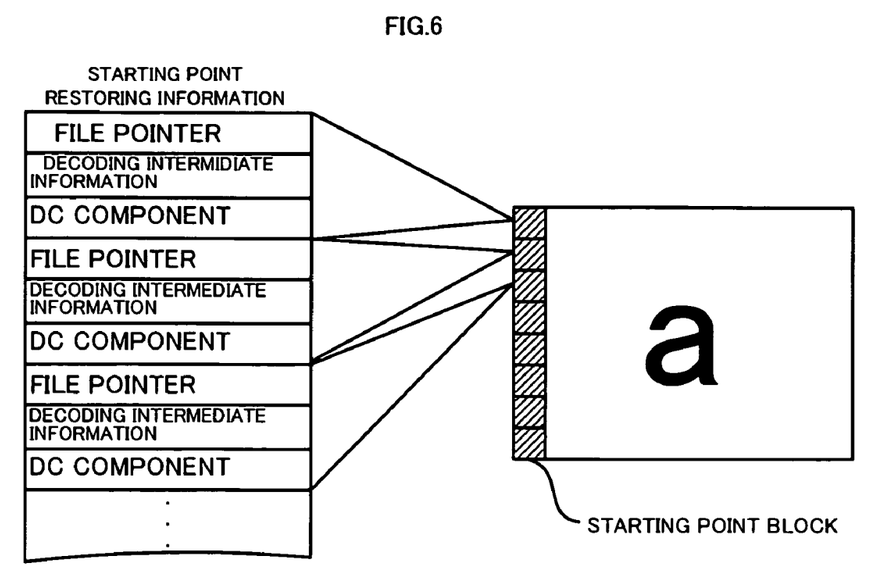
FIG. 6 is a diagram showing an example of starting point restoring information.

When the present block is not the last block of the image file, the processing returns to step S100 (step S190), and the processing of steps S100 to S180 is repetitively executed on the next block. FIG. 6 is a diagram showing an example of starting point restoring information when the processing of steps S100 to S180 is repetitively executed. As shown in FIG. 6, in the embodiment, the blocks at the left end of an image are set as starting point blocks, and thus the starting point restoring information (the file pointers, the decoding intermediate information and the DC components) for the blocks at the left end are sequentially stored from the upper block. As described above, by sequentially restoring the image file from the head thereof, the starting point restoring information and the histogram of the RGB values are obtained and stored in the data buffer 24.

When the processing of the steps S100 to S180 is repetitively executed until the last block of the image file as described above, automatic correction processing parameters for subjecting the image file to automatic correction processing is calculated on the basis of the histogram of the RGB values accumulated, and stored in a predetermined area of the data buffer 24 (step S200). Here, the automatic correction processing is the processing of correcting an image in accordance with the characteristic of the pixel information of the image file, and the calculation of the automatic correction processing parameter may be carried out by applying various kinds of rules. In the embodiment, parameters used for the processing for enlarging the width of the RGB value distribution to correct the contrast, the γ correction processing to correct the brightness of the image, etc., are calculated and set on the basis of the histogram of the RGB values.

Subsequently, the file pointer of the first starting point block of the starting point restoring information stored in the data buffer 24 is read in, and the data of the access unit specified by the read-in file pointer is read out from the storage medium 30, etc., and subjected to the Huffman decoding (steps S210, S220). At this time, by using the decoding intermediate information of the starting point restoring information, the data of the starting point block out of the data of the access unit can be decoded.

When the data of one block is decoded (step S230), the inverse quantization processing, the inverse DCT calculation processing and the color conversion processing are executed (steps S240 to S260). Here, when the DC component of the DCT coefficient is obtained, the DC component of the starting point restoring information is read in.

Subsequently, the block is subjected to the automatic correction processing according to the automatic correction processing parameters calculated in step S200 (step S270), and rotated clockwise by 90° and then outputted to a predetermined area of the data buffer 24 (step S280). When the block is outputted to the predetermined area of the data buffer 24, the block itself is rotated and outputted so that the position of the block is set to the position after the rotation (for example, the block at the upper left corner is set to be located at the upper right corner).

Figure 7:
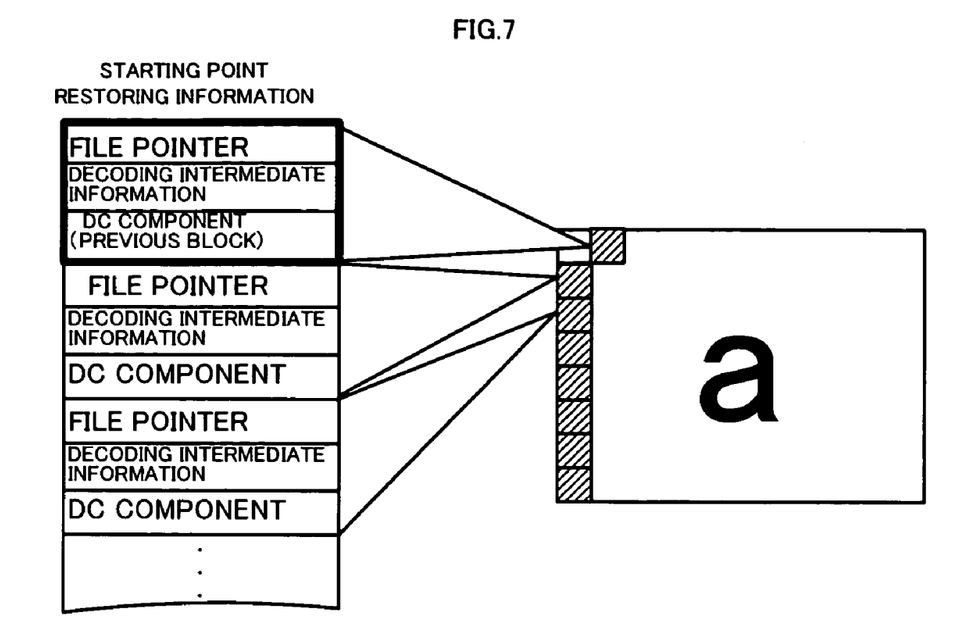
FIG. 7 is a diagram showing an aspect that the starting point restoring information is updated.

When the block is rotated and outputted as described above, the starting point restoring information of the block is updated to the starting point restoring information of the next block (the right-side adjacent block) (step S290). That is, it is updated to the file pointer of the access unit at which the data of the next block is started, the decoding intermediate information and the DC component (see FIG. 7). With respect to the DC component, the quantized DC component of the present block is stored. Accordingly, when the next block is restored, the quantized DC component and the differential value obtained by subjecting the data of the next block to Huffman decoding are accumulated to obtain the quantized DC component of the next block.

Figure 8:
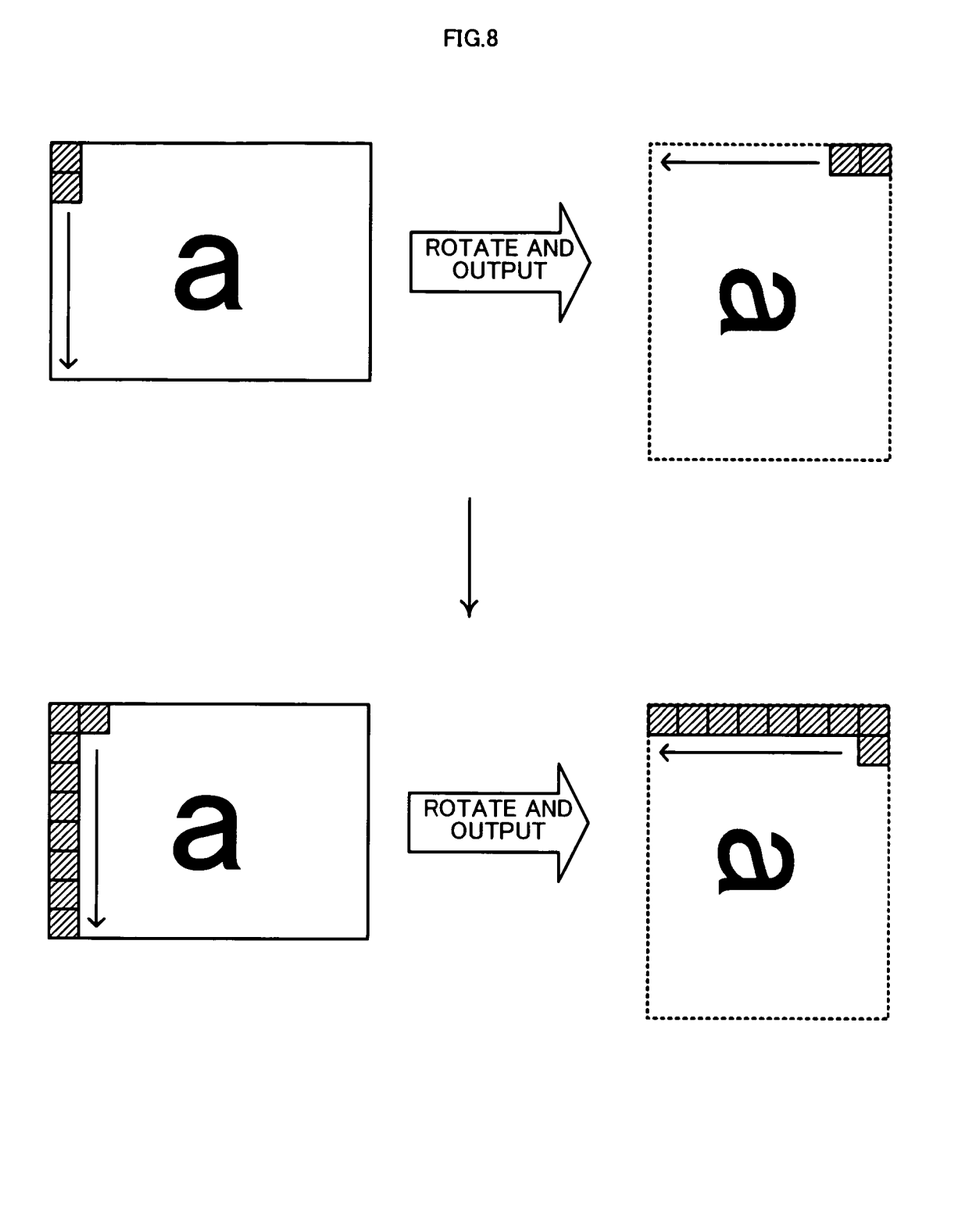
FIG. 8 is a diagram showing an aspect that the processing of steps S210 to S290 is executed.
Figure 9:
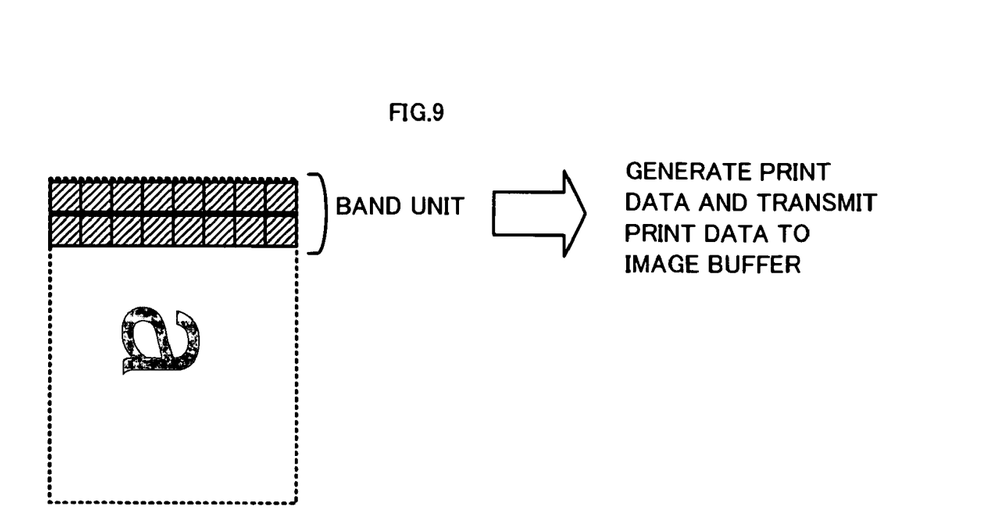
FIG. 9 is a diagram showing an aspect that accumulated blocks after rotation are set as a band unit.

The processing of the steps S210 to S290 is repetitively executed until the post-rotation blocks outputted to the predetermined area of the data buffer 24 are accumulated and they reach a band unit corresponding to a print execution unit of the printer engine 27 (step S300). FIG. 8 is a diagram showing an aspect that the processing of the steps S210 to S290 is repetitively executed. FIG. 8 is a diagram showing an aspect that the processing of the steps S210 to S290 is repetitively executed. As shown in FIG. 8, the processing of the steps S210 to S290 is sequentially executed on the blocks at the left end as a starting point block from the upper end blocks, thereby outputting the blocks at the upper end of the post-rotation image. When the processing to be executed on the blocks at the left end is finished, the processing of the steps S210 to S290 is repetitively executed on the blocks on the column located just at the right side adjacent of the left end blocks sequentially from the upper end. When the accumulated post-rotation blocks reach the band unit as shown in FIG. 9, the print data is generated on the basis of the data of the band unit by the print data generator 25, and then outputted to the image buffer 26. The printer engine 27 carries out printing on the basis of the print data (step S310). When the processing reaches the last block of the image file (step S320), the image rotating and printing processing is finished.

According to the printer 20 of the above-described embodiment, the image file is sequentially restored from the head thereof to obtain the starting point restoring information and the histogram of the RGB values and are stores in the data buffer 24, and the image file is restored from the starting block by using the starting point restoring information to sequentially generate the image after the rotation from the upper end thereof. Furthermore, the image file is subjected to the automatic correction processing corresponding to the histogram of the RGB values and outputted. Accordingly, in the process of restoring the image file to accumulate the histogram of the RGB values of the image file, the starting point restoring information can be obtained and stored. That is, as compared with the case where the restoration of the image file to accumulate the histogram of the RGB values and the restoration of the image file to obtain the starting point restoring information are separately carried out from each other, the processing time can be further shortened and the efficiency of the processing can be further enhanced.

Here, in the printer 20 of the embodiment, the data buffer 24 corresponds to a data storage module, the controller 21 and the image processor 23 for executing the processing of the steps S100 to S190 correspond to an information calculating and obtaining module, and the controller 21 and the image processor 23 for executing the processing of the steps S200 to S300 correspond to an image generator and an image output module. Furthermore, the interface portion 22 corresponds to a data obtaining module, and the controller 21, the print data generator 25 and the printer engine 27 for executing the processing of the step S310 correspond to a print executing module. Furthermore, the histogram of the RGB value corresponds to characteristic information, and the file pointer of the starting point restoring information and the decoding intermediate information correspond to address information.

In the printer 20 of the embodiment, the description has been made by using the image file compressed in the JPEG format as an example. However, it is obvious that the printer 20 is applicable to image files compressed in other formats. In this case, information required to restore the image file from a predetermined position (for example, the pixels at the left end) may be stored as starting point restoring information in accordance with the compression format.

In the printer 20 of the embodiment, the histogram of the RGB values of the image file is accumulated, and the automatic correction processing parameter is set in accordance with the histogram of the RGB values. However, other information may be used insofar as it indicates the characteristic of an image. Furthermore, the processing for enlarging the distribution of the RGB values to correct contrast and they correction processing for correcting the brightness of an image have been described as examples. However, other image processing may be carried out insofar as it is the image processing based on the image characteristic.

Figure 10:
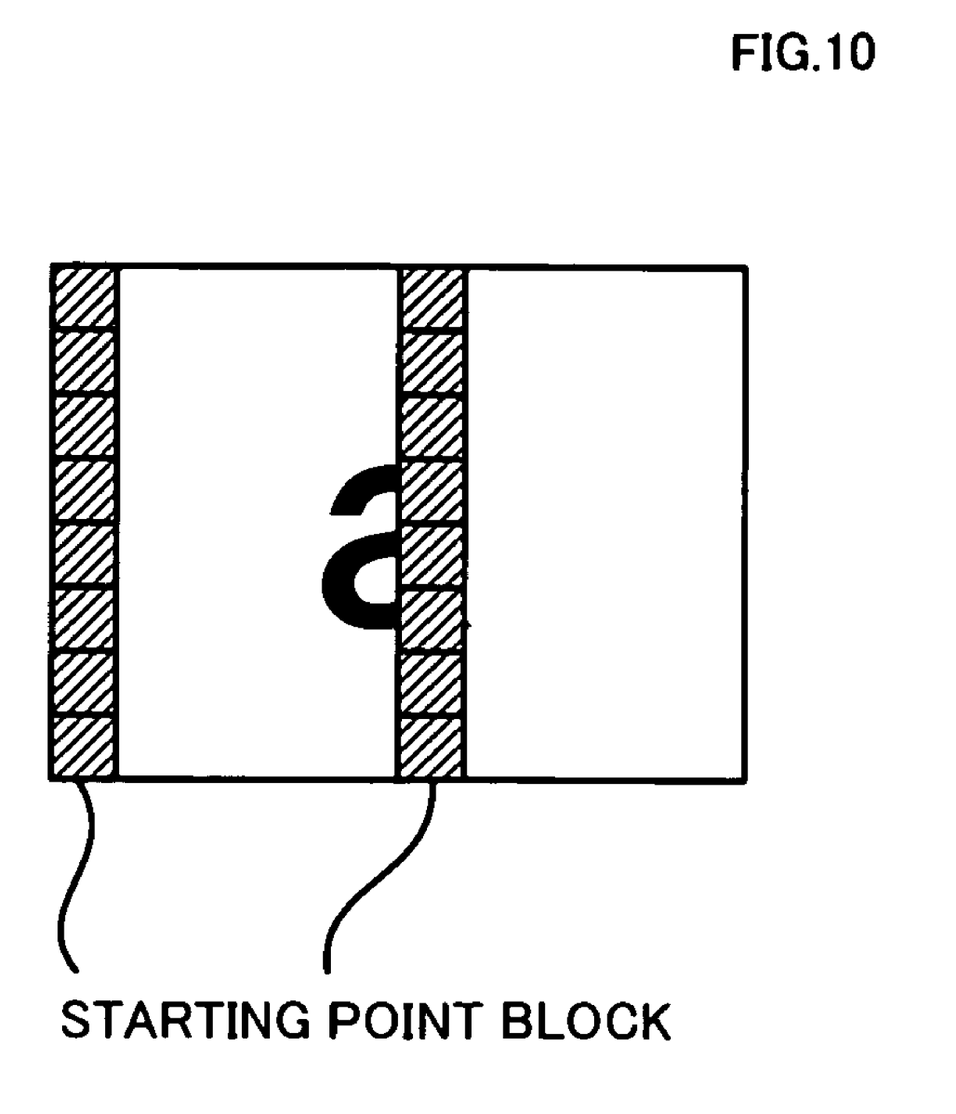
FIG. 10 is a diagram showing an example of starting blocks of a modification.

In the printer 20 of the embodiment, the 90° clockwise rotation has been described as a specific example. However, it is obvious that the printer is not limited to this example. For example, when an image is rotated by 180°, by sequentially restoring the blocks at the left end as starting point blocks, the image can be sequentially outputted from the blocks at the upper end of the image after the rotation. Furthermore, when an image is counterclockwise rotated by 90°, in addition to the blocks at the left end, as shown in FIG. 10, the blocks of the column located substantially at the center of the image file are set as starting point blocks. The upper half of the image after the rotation may be restored by using the starting point blocks of the column located substantially at the center as starting points while the lower half of the image after the rotation may be restored by using the starting point blocks at the left end as starting points.

In the embodiment, the present invention in which the starting point restoring information and the histogram of the RGB values are obtained by sequentially restoring the image file from the head thereof and stored in the data buffer 24 has been described as the style of the printer 20. However, it may be used as the style of an image processing apparatus for carrying out the image processing. Furthermore, it may be used as the style of an image processing method or an image processing program.

The best modes for carrying out the present invention have been described by using the embodiments. However, the present invention is not limited to these embodiments, and the present invention can be implemented in various styles without departing from the gist of the present invention.

The specification hereof refers to Japanese Patent Application No. 2004-282533 (filed on Sep. 28, 2004) and incorporates herein all the details of the specifications, the drawings, and the claims disclosed therein.

What is claimed is:

1. An image processing apparatus for restoring compressed data of an image and subjecting the image to predetermined image processing, comprising:
   a data storage module for storing data;
   an information calculating and obtaining module for sequentially restoring compressed data of an indicated image from the head thereof to the extent that at least pixel information can be obtained, calculating characteristic information indicating the characteristic of the image on the basis of the pixel information, storing the characteristic information in the data storage module, obtaining starting point restoring information for restoring the compressed data with a predetermined position of the image as a starting point in a process of restoring the compressed data and storing the starting point restoring information into the data storage module;
   an image generator for restoring the compressed data of the image on the basis of the starting point restoring information stored in the data storage module with the predetermined position as a starting point when an output instruction containing rotation of the indicated image is made, thereby sequentially generating the image after the rotation from the upper end thereof, and also carrying out predetermined image processing on the image after the rotation generated on the basis of the characteristic information stored in the data storage module; and
   an image output module for outputting the image subjected to the predetermined image processing.

2. The image processing apparatus according to claim 1, wherein the starting point restoring information is information containing address information in the compressed data of the image corresponding to the predetermined position.

3. The image processing apparatus according to claim 1, wherein the predetermined position contains a position which will be the upper end when the image is rotated in a predetermined direction by a predetermined angle.

4. The image processing apparatus according to claim 1, wherein the information calculating and obtaining module calculates the characteristic information on the basis of pixel information of predetermined sampling target pixels and stores the calculated characteristic information into the data storage module.

5. The image processing apparatus according to claim 4, wherein the compressed data of the image is data based on the JPEG format obtained by dividing the image into blocks each comprising a plurality of pixels and then compressing the image, and
   the starting point restoring information contains not only address information in the compressed data of the image corresponding to the block at the predetermined position, but also the DC component of a DCT coefficient of the block.

6. The image processing apparatus according to claim 5, wherein the information calculating and obtaining module restores the compressed data of the image by an entropy decoding step of subjecting the compressed data of the indicated image to entropy decoding to obtain a quantized DCT coefficient, an inverse quantizing step of subjecting the obtained quantized DCT coefficient to inverse quantization to obtain a DCT coefficient, and an inverse DCT step of subjecting the obtained DCT coefficient to inverse DCT to obtain pixel information, whereby the quantized DC component of the quantized DCT coefficient in the entropy decoding step or the DC component of the DCT coefficient obtained in the inverse quantizing step is obtained as the DC component of the starting point restoring information.

7. A printer comprising:
   a data obtaining module for obtaining compressed data of an image from a communicable storage medium;
   a data storage module for storing data;
   an information calculating and obtaining module for sequentially restoring compressed data of an indicated image from the head thereof to the extent that at least pixel information can be obtained, calculating characteristic information indicating the characteristic of the image on the basis of the pixel information, storing the characteristic information in the data storage module, obtaining starting point restoring information for restoring the compressed data with a predetermined position of the image as a starting point in a process of restoring the compressed data and storing the starting point restoring information into the data storage module;

an image generator for restoring the compressed data on the basis of the starting point restoring information stored in the data storage module with the predetermined position as a starting point when an output instruction containing rotation of the indicated image is made, thereby sequentially generating the image after the rotation from the upper end thereof, and also carrying out predetermined image processing on the image after the rotation generated on the basis of the characteristic information stored in the data storage module;

an image output module for outputting the image subjected to the predetermined image processing; and a print executing module for printing the outputted image.

8. The printer according to claim 7, wherein the starting point restoring information is information containing address information in the compressed data of the image corresponding to the predetermined position.

9. The printer according to claim 7, wherein the predetermined position contains a position which will be the upper end when the image is rotated in a predetermined direction by a predetermined angle.

10. The printer according to claim 7, wherein the information calculating and obtaining module calculates the characteristic information on the basis of pixel information of predetermined sampling target pixels and stores the calculated characteristic information into the data storage module.

11. The printer according to claim 10, wherein the compressed data of the image is data based on the JPEG format obtained by dividing the image into blocks each comprising a plurality of pixels and then compressing the image, and the starting point restoring information contains not only address information in the compressed data of the image corresponding to the block at the predetermined position, but also the DC component of a DCT coefficient of the block.

12. The printer according to claim 11, wherein the information calculating and obtaining module restores the compressed data of the image by an entropy decoding step of subjecting the compressed data of the indicated image to entropy decoding to obtain a quantized DCT coefficient, an inverse quantizing step of subjecting the obtained quantized DCT coefficient to inverse quantization to obtain a DCT coefficient, and an inverse DCT step of subjecting the obtained DCT coefficient to inverse DCT to obtain pixel information, whereby the quantized DC component of the quantized DCT coefficient in the entropy decoding step or the DC component of the DCT coefficient obtained in the inverse quantizing step is obtained as the DC component of the starting point restoring information.

13. An image processing method for restoring compressed data of an image and subjecting the image to predetermined image processing, comprising using a processor to perform the steps of:

(a) sequentially restoring compressed data of an indicated image from the head thereof to the extent that at least pixel information can be obtained, calculating characteristic information indicating the characteristic of the image on the basis of the pixel information, storing the characteristic information, obtaining starting point restoring information for restoring the compressed data with a predetermined position of the image as a starting point in a process of restoring the compressed data and storing the starting point restoring information;

(b) restoring the compressed data of the image on the basis of the starting point restoring information stored in the step (a) with the predetermined position as a starting point when an output instruction containing rotation of the indicated image is made, thereby sequentially generating the image after the rotation from the upper end thereof, and also carrying out predetermined image processing on the image after the rotation generated on the basis of the characteristic information stored in the step (a); and (c) outputting the image subjected to the predetermined image processing.

14. A computer-readable medium stored with an image processing program of restoring compressed data of an image and subjecting the compressed data of the image to predetermined image processing, wherein the image processing program is equipped with an information calculating and obtaining module for sequentially restoring the compressed data of the indicated image from the head thereof to the extent that at least pixel information can be obtained, calculating characteristic information indicating the characteristic of the image on the basis of the pixel information, storing the characteristic information, obtaining starting point restoring information for restoring the compressed data with a predetermined position of the image as a starting point in a process of restoring the compressed data and storing the starting point restoring information; an image generating module for restoring the compressed data of the image with the predetermined position as a starting point on the basis of the starting point restoring information stored in the information calculating and obtaining module when an output instruction containing rotation of the indicated image is made, thereby sequentially generating the image after the rotation from the upper end thereof, and subjecting the generated image after the rotation to predetermined image processing on the basis of the characteristic information stored in the information calculating and obtaining module; and an image output module for outputting the image subjected to the predetermined image processing.

* * * * *